(12) United States Patent
Emerton et al.

(10) Patent No.: US 9,903,995 B2
(45) Date of Patent: Feb. 27, 2018

(54) FLAT PANEL ILLUMINATOR WITH CONCENTRATOR

(71) Applicant: Microsoft Technology Licensing, LLC, Redmond, WA (US)

(72) Inventors: Neil Emerton, Redmond, WA (US); Lincoln Ghioni, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 44 days.

(21) Appl. No.: 15/059,934

(22) Filed: Mar. 3, 2016

(65) Prior Publication Data

US 2017/0254944 A1 Sep. 7, 2017

(51) Int. Cl.
*F21V 7/04* (2006.01)
*F21V 8/00* (2006.01)

(52) U.S. Cl.
CPC ......... *G02B 6/0031* (2013.01); *G02B 6/0025* (2013.01)

(58) Field of Classification Search
CPC ........................... G02B 6/0031; G02B 6/0053
USPC ........................................ 362/600, 609, 97.1
See application file for complete search history.

(56) References Cited

U.S. PATENT DOCUMENTS

| 5,255,171 A | 10/1993 | Clark |
| 5,727,108 A | 3/1998 | Hed |
| 5,810,469 A | 9/1998 | Weinreich |
| 6,796,700 B2 | 9/2004 | Kraft |
| 8,757,858 B2 | 6/2014 | Aastuen et al. |
| 2002/0130264 A1 | 9/2002 | Wichner |
| 2004/0080938 A1 | 4/2004 | Holman et al. |
| 2007/0047260 A1 | 3/2007 | Lee et al. |
| 2009/0034289 A1 | 2/2009 | Bu et al. |
| 2010/0220484 A1* | 9/2010 | Shani ..................... G02B 5/021 362/296.09 |
| 2010/0238684 A1 | 9/2010 | Chiu et al. |
| 2010/0269886 A1 | 10/2010 | Argentar |
| 2011/0050580 A1 | 3/2011 | Travis et al. |

(Continued)

FOREIGN PATENT DOCUMENTS

| DE | 102011055429 A1 | 5/2013 |
| KR | 20120022288 A | 3/2012 |

(Continued)

OTHER PUBLICATIONS

Antonini, et al., "Modelling of Compound Parabolic Concentrators for Photovoltaic Applications", In International Journal of Optics and Applications, vol. 3, Issue 4, Retrieved on: Dec. 9, 2015, pp. 40-52.

(Continued)

*Primary Examiner* — Jamara Franklin
(74) *Attorney, Agent, or Firm* — Alleman Hall Creasman & Tuttle LLP

(57) ABSTRACT

Examples are disclosed that relate to the coupling of light into a light guide for a backlight system. One disclosed example provides a flat-panel illuminator comprising a concentrating reflector, a light guide, and one or more light emitters. The example includes a curved reflective portion, a light guide including a planar face and an input edge positioned adjacent the concentrating reflector, and the one or more light emitters are arranged within the concentrating reflector and spaced from the input edge of the light guide.

20 Claims, 4 Drawing Sheets

(56) References Cited

U.S. PATENT DOCUMENTS

2014/0376260 A1  12/2014  Powell et al.
2016/0097890 A1*  4/2016  Vasylyev ............... G02B 3/005
                                                362/606

FOREIGN PATENT DOCUMENTS

WO    2008083018 A1    7/2008
WO    2009149010 A1    12/2009

OTHER PUBLICATIONS

U.S. Appl. No. 14/552,762, Large, Timothy, "Laminated Backlight Unit", filed Nov. 25, 2014.
Welford, W. et al., "High Collection Nonimaging Optics," Academic Press, Inc., Dec. 28, 1989, San Diego, California, 150 pages.
ISA European Patent Office, International Search Report and Written Opinion Issued in PCT Application No. PCT/US2017/019299, dated Jun. 27, 2017, WIPO, 21 Pages.

* cited by examiner

FLAT PANEL ILLUMINATOR WITH CONCENTRATOR

BACKGROUND

Some electronic displays include a light guide edge-lit by a row of light-emitting diodes (LEDs). One consideration for such displays is the efficiency at which light emission from the LEDs is coupled into the light guide. Losses at the LED/light-guide interface may result in reduced display brightness, increased power consumption, and stray light effects that may degrade display image quality.

SUMMARY

Examples are disclosed that relate to the coupling of light into a light guide for a backlight system. One disclosed example provides a flat-panel illuminator comprising a concentrating reflector, a light guide, and one or more light emitters. The example includes a curved reflective portion, a light guide including a planar face and an input edge positioned adjacent the concentrating reflector, and the one or more light emitters are arranged within the concentrating reflector and spaced from the input edge of the light guide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve the disadvantages identified in this disclosure.

DETAILED DESCRIPTION

Figure 1:
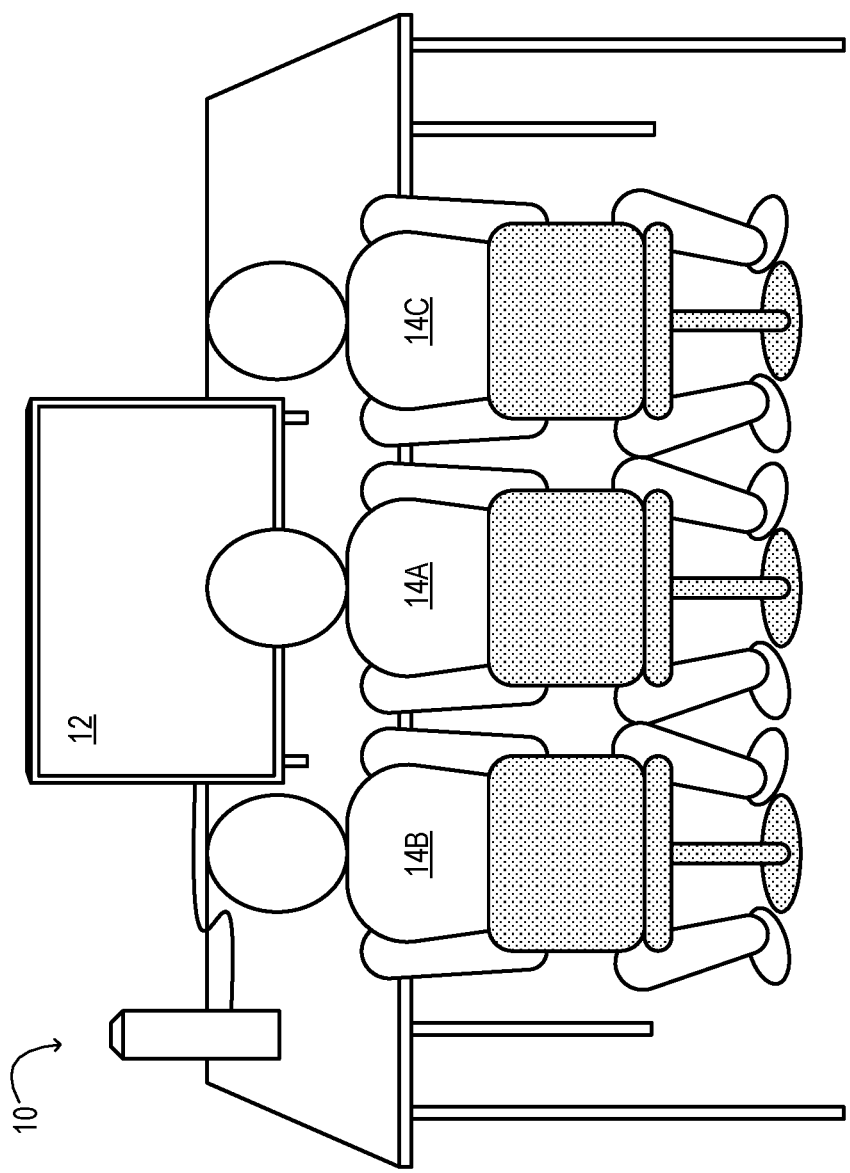
FIG. 1 shows aspects of an example device having an electronic display.

As noted above, efficient optical coupling of light from a light emitter to into a light guide is generally desirable in edge-lit backlight applications. For example, a backlight system may utilize a white LED, which has an approximately Lambertian radiation pattern, as a light emitter. The light guide, however, may be configured to receive light over a more limited range of angles. This is especially so in 'solid' backlight configurations, where the range of acceptance angles of the light guide may be particularly narrow. Thus, a concentrator may be used to narrow the distribution of light output by the light emitter. Previously, concentrators for coupling LED emission into a light guide have involved lens-like protuberances molded or machined into the edge of the light guide, a configuration which may be difficult and expensive to manufacture. Further, the use of large coupling optics at the input edge of the light guide may result in increased bezel width and/or thickness.

Accordingly, the present disclosure describes examples of optical concentrators that may achieve high coupling efficiency by converting most of the light from a light emitter into a beam spanning a desired elliptical angular range. The disclosed examples are not molded or machined into the light guide, but instead are separated from the light guide by an air-filled gap. This may help to shorten a distance between the light emitter and the functional area of the light guide (the portion that provides light to a spatial light modulator) relative to concentrators that are integrated into an edge region of a light guide.

Aspects of this and other implementations will now be described by example, and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and not necessarily drawn to scale. Except where specifically noted, the various drawing scales, aspect ratios, and numbers of components shown in the figures may be purposely distorted to make certain features or relationships easier to see.

FIG. 1 shows an example device 10 having an electronic display 12. The device of FIG. 1 is a desktop computer system with a peripheral display monitor. However, the disclosed examples are also applicable to other devices, including but not limited to laptop computers with integrated display monitors, flat-screen televisions, tablet computers, smartphones, portable game systems, console game systems, and media players, for example.

Figure 2:
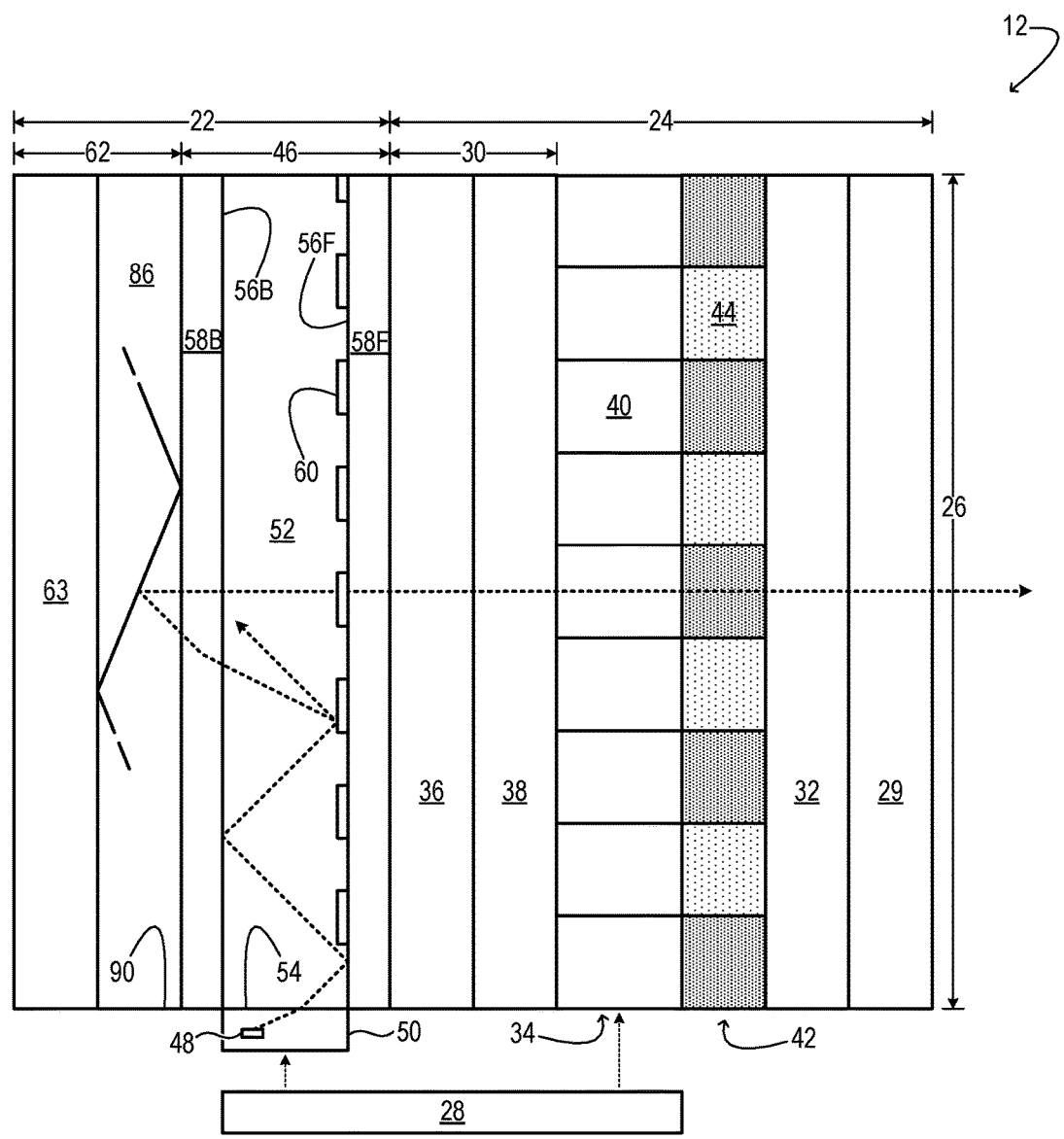
FIG. 2 is a schematic, cross-sectional drawing of an example electronic display.

FIG. 2 shows aspects of an example electronic display 12 of device 10. The electronic display includes a flat-panel illuminator 22 and an image-forming layer 24 configured to form a display image in display area 26 by spatially modulating light released by the flat-panel illuminator. Such modulation may be controlled via electronic controller 28.

In some implementations, image-forming layer 24 may be a liquid-crystal display (LCD) layer arranged beneath a protective glass or transparent molded sheet 29. As such, the image-forming layer may include an upstream polarizer 30, a downstream polarizer 32, and a pixel matrix 34 arranged between the upstream and downstream polarizers. Each of the upstream and downstream polarizers may be configured to transmit plane polarized light. Light from flat-panel illuminator 22 is filtered by the upstream polarizer to select light of a predetermined polarization state. In some implementations, upstream polarizer 30 may include a recycling polarizer 36 situated upstream of an absorptive polarizer 38. The recycling polarizer reflects at least some light of an undesired polarization state back to the flat-panel illuminator. The absorptive polarizer absorbs the remaining light of the undesired polarization state, to help maintain a suitably high overall contrast ratio in polarization-state selection. Accordingly, substantially plane-polarized light passes into pixel matrix 34 of the image-forming layer.

At each individually addressable pixel element 40 of pixel matrix 34, the polarization plane of the incident light may be rotated by twisted-nematic liquid crystal therein. The twisted-nematic liquid crystal is formed when the pixel element is biased electrically, via electronic controller 28. When the bias is removed, the twisted-nematic liquid crystal relaxes to the twisted state, which does not rotate the polarization plane. In implementations in which the upstream and downstream polarizers have the same orientation, light having a rotated polarization plane is blocked by the downstream polarizer commensurate to the degree of rotation. Thus, by providing controlled electrical bias to each of the pixel elements, a display image is formed in display area 26 by the light passing through image-forming layer 24.

In some implementations, image-forming layer 24 includes a color-filter matrix 42 of individual color-filter elements 44 arranged in registry with pixel elements 40. Red-, green-, and blue-transmissive color filter elements may be arranged in a repeating pattern in the color-filter matrix, to enable formation of a full-color image. In monochrome display implementations, the color-filter matrix may be omitted.

Flat-panel illuminator 22 includes light guide 46 and one or more light emitters 48 configured to direct light into the light guide via a concentrating reflector 50. The configuration of light emitters 48 is not particularly limited. In some implementations, the light emitters may be side-emitting, surface-mount light-emitting diodes (LEDs). Concentrating reflector 50, described in more detail below, narrows an angular distribution of light from the one or more light emitters to help couple the light efficiently into light guide 46.

Light guide 46 includes a transparent material 52, such as polycarbonate, acrylic, or glass. The light guide comprises an input edge 54 where light emission from light emitters 48 is received. Adjacent the input edge 54 of the light guide are parallel, planar faces 56 (viz., 56F and 56B), each bounded by the input edge. This structure allows propagation of the light received at the input edge by total-internal reflection (TIR) from the planar faces. In some implementations, planar faces 56F and 56B may directly interface with air. In other implementations, light guide 46 includes one or more of a first cladding layer 58F and a second cladding layer 58B. The first and second cladding layers are arranged on opposite sides of core material 52. In some implementations, the light guide may be coupled optically to image-forming layer 24 via the front cladding layer.

The refractive indices of first cladding layer 58F and second cladding layer 58B are lower than that of material 52. In some implementations, the refractive index of the forward cladding layer may be lower than that of the back cladding layer, so that the propagating light is released (wholly or preferentially) from back face 56B. To promote release of the propagating light, light guide 46 includes a plurality of light-extraction features 60. The extraction features may be formed in any suitable manner, such as by machining, embossing or other molding method, and may have any suitable size.

When the propagating light interacts with an extraction feature, some of the light is scattered at a subcritical angle and is therefore released from the light guide. A portion of the light, more specifically, is scattered down toward the turning film, and another portion is sent up toward the display. Accordingly, the flat-panel illuminator also includes a turning structure 62 configured to redirect the emerging rays through image-forming layer 24 at an acceptable angle for image production and viewing. Such rays are filtered by image-forming layer 24 to form a display image in display area 26. In the illustrated implementation, the turning structure includes a faceted molded film 86 laminated onto a metallic plate 63, but the turning structure may have any other suitable structure.

Concentrating reflector 50 includes a curved reflective portion. In the illustrated implementation, the curved reflective portion is a parabolic reflective portion 64 having an axis 66 and a focus 68. Curvatures that deviate from strict parabolic geometry may also be used. In some examples, concentrating reflector 50 may extend along a length of the input edge 54 of the light guide to angularly concentrate light along one cross-sectional dimension (e.g., such that light is angularly concentrated in a direction along a thickness of the light guide but not along length of the light guide input edge 54). In other examples, concentrating reflector 50 may be configured to angularly concentrate light along two cross-sectional dimensions, such that light is concentrated along both the length and thickness of the input edge 54.

Figure 3:
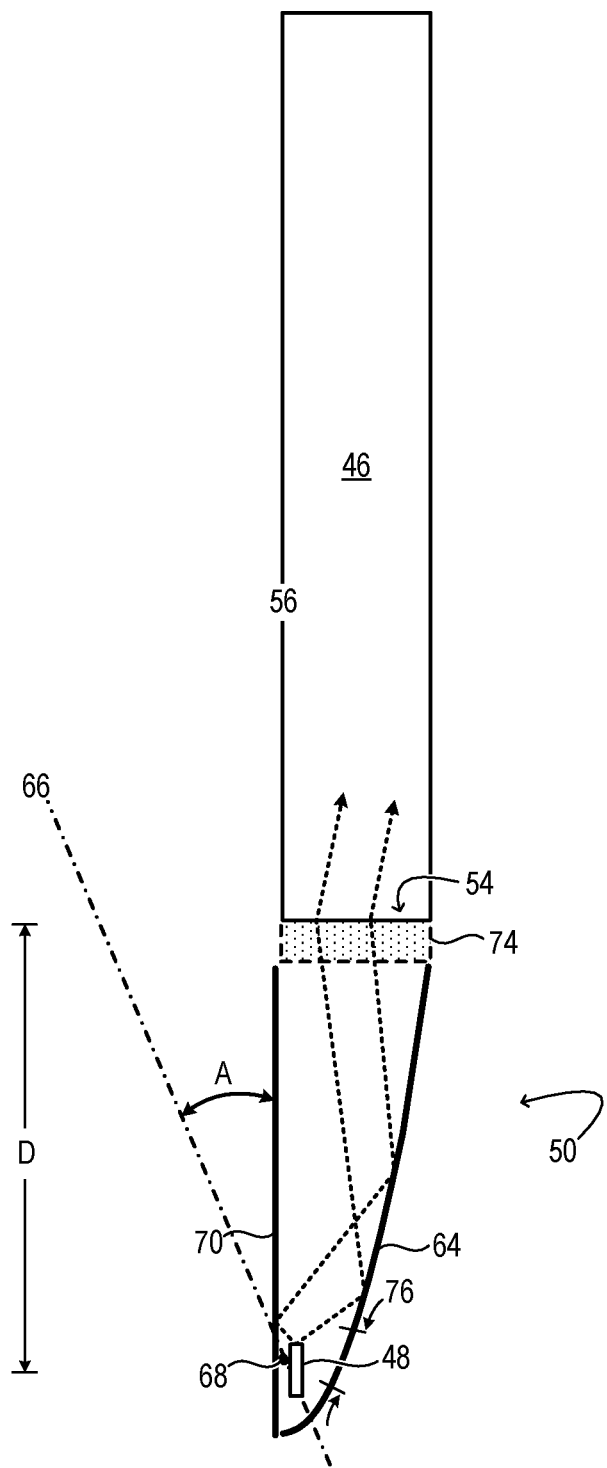
FIG. 3 is a cross-sectional drawing of an example concentrating reflector.

In the implementation of FIG. 3, concentrating reflector 50 also includes a planar reflective portion 70 oriented obliquely with respect to axis 66. In FIG. 3, the planar reflective portion 70 is approximately parallel to planar face 56 of light guide 46. In other implementations, the axis, planar reflective portion, and light guide may be positioned differently with respect to each other. Each of planar reflective portion 70 and parabolic reflective portion 64 may be coated with a suitably reflective outer layer (e.g. silver-coated aluminum), or may be formed from a material of sufficient reflectivity that an outer layer may be omitted.

In examples in which planar reflective portion 70 is included, instead of providing parabolic reflective portion 64 in two halves divided by a symmetry plane, one half is provided. This allows the concentrator to be fit in a smaller space than a concentrator with parabolic reflectors on each side. More specifically, LED light emitters 48 (vide infra) may rest on a circuit board that extends in a plane directly in front of and below the LED aperture. In this configuration, there may not be adequate room for a shaped reflector. A flat mirror surface is therefore space-saving. Conveniently this mirrored surface may take the form of a thin reflective film (e.g. a polymer reflective film or other suitable material) applied to the circuit board.

Continuing with FIG. 3, one or more light emitters 48 may be arranged in suitable proximity to the focus 68 of parabolic reflective portion 64. In one-dimensional concentrating variants—where focus 68 is a line parallel to input edge 54—a series of light emitters may be arranged along a length of the input edge in proximity to focus 68. In two-dimensional concentrating variants, a single light emitter may be positioned in proximity to focus 68, and a series of discrete concentrating reflectors and associated light emitters may be arranged along the input edge. In the example of FIG. 3, light guide 46 is tilted with respect to axis 66 of the parabolic reflective portion, such that the axis makes an angle A with planar face 56 of the light guide.

In the implementation of FIG. 3, light emitter 48 is separated from input edge 54 of light guide 46 by an air-filled gap extending through lateral distance D. An optional weak diffuser 74 may be arranged between the emitter and the input edge This helps reduce the appearance of hot spots at the input edge by spreading the light laterally on entrance to the light guide. In other implementations, a prism structure may be used in lieu of the weak diffuser. The air gap provides a space-saving advantage over configurations in which the concentrator is integrated into an edge region of the light guide. In effect, the low refractive index of air enables high-angle rays going into the concentrator, which makes the distance D smaller than it otherwise would be. In an alternative, all-solid concentrator, the ray angle is reduced as soon as the ray enters the solid. As a consequence, the angle of the ray would have to be changed by reflection from the parabolic profile, which would take up more space. As such, a lateral distance D from the light emitter 48 to a functional portion of the light guide (e.g., the portion from which light is emitted for backlighting) may be shorter than would be the case for small-angle coupling. This shortened lateral distance may help to achieve a narrower bezel at the input edge to accommodate the light emitters and concentrator(s). Moreover, the disclosed examples may help to reduce the number of rays exiting the concentrator at high angles, thereby reducing propagation losses in the light guide and 'hot spots' in display close 26 to the input edge, compared to other concentrators. Nevertheless, in other examples, light emitter 48 may be separated from input edge 54 by a transparent solid. Here, concentrating reflector 50 may include a straightened reflective section within parabolic reflective portion 64. FIG. 3 shows the location 76 of the straightened reflective section between hash marks drawn on the parabolic reflective portion. In implementations in which a straightened reflective portion is included, this portion may abut parabolic reflective portion 64 and may be oriented obliquely with respect to axis 66 of the parabolic reflective portion. The straightened reflective section corrects for the 'already expanded' trajectory of the emission in all-solid implementations.

Figure 4:
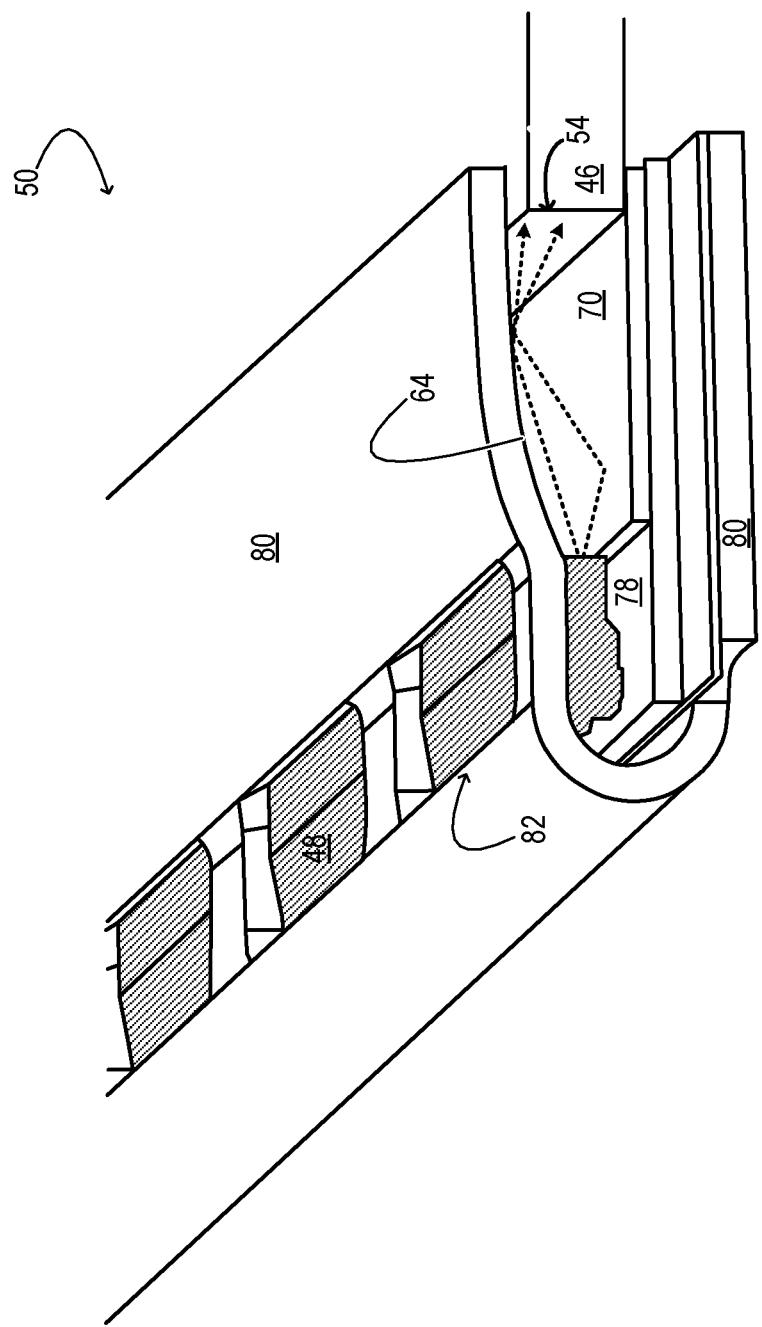
FIG. 4 is a view of another example concentrating reflector.

FIG. 4 shows a view of an example implementation of concentrating reflector 50 configured to concentrate light in a direction along a thickness of a light guide (i.e., along one cross-sectional dimension). In the configuration of FIG. 4, the light emitters 48 are side-emitting, surface-mount LEDs coupled to a circuit board 78. In some implementations, planar reflective portion 70 of concentrating reflector 50 may be laminated to circuit board 78. Further, in the illustrated example, parabolic reflective portion 64 and planar reflective portion 70 of concentrating reflector 50 are portions of the same formed sheet 80, and the light guide 46 extends partially into the space between parabolic reflective portion 64 and planar reflective portion 70, such that input edge 46 is located between these structures. Additionally, an air-filled gap exists between the light emitters 48 and the light guide 46. As mentioned above, this may allow the distance between the light emitters and a functional portion of the light guide (e.g., where light is emitted for backlighting) to be reduced, thereby reducing a size of a display device bezel used to hide the concentrating reflector 50 and circuit board 78.

The formed sheet may include a series of openings 82 to accommodate the height of the one or more light emitters 48. In other implementations, formed sheet 80 may include a series of raised bumps configured to accommodate the height of the one or more light emitters, instead of or in addition to, openings. Further, formed sheet 80 may include one or more openings (not shown) to accommodate circuit board 78. In some examples, the formed sheet comprises a stamped metal sheet coated with a suitably reflective coating. In other examples, the formed sheet may be sufficiently reflective to omit such a coating.

No aspect of the foregoing configurations should be construed as limiting in any sense, for numerous variations, additions, and omissions are envisaged as well. For example, concentrating reflector 50 may serve not only to couple the direct output of light emitters 48 into light guide 46, but also to provide a 'recycling cavity' for light returning from outside the reflector. Such light may be guided through one or more reflections within the concentrating reflector and emerge again as useful light of a desired angle. One source of the returning light may be reflection from input edge 54 of light guide 46. Another potential source is light reflecting from the far back edge of the light guide and returning through the whole system to the locus of light emitters 48. Yet another source may be light that has leaked out of the light guide near the input edge—e.g., light that was not properly guided to the requisite range of angles. Such light may be returned into the system by use of a reflector or lens added for this purpose.

Another example provides a flat-panel illuminator comprising a concentrating reflector including a curved reflective portion, a light guide including a planar face and an input edge positioned adjacent the concentrating reflector, and one or more light emitters arranged within the concentrating reflector and spaced from the input edge of the light guide by an air-filled gap.

In some implementations, the curved reflective portion is a parabolic reflective portion, and the concentrating reflector alternatively or additionally includes a planar reflective portion. In some implementations, the planar reflective portion is alternatively or additionally oriented obliquely to an axis of the parabolic reflective portion. In some implementations, the light guide is alternatively or additionally positioned at least partially between the parabolic reflective portion and the planar reflective portion. In some implementations, the flat-panel illuminator alternatively or additionally further comprises a diffuser or prism structure incorporated at the input edge of the light guide. In some implementations, the curved reflective portion alternatively or additionally is configured to concentrate light in a direction along a thickness direction of the light guide. In some implementations, the curved reflective portion alternatively or additionally is configured to concentrate light along a thickness of the light guide and along a length of the input edge. In some implementations, the one or more light emitters alternatively or additionally comprise one or more side emitting light-emitting diodes.

Another example provides a flat-panel illuminator comprising a light guide having a planar face and an input edge, a concentrating reflector having a parabolic reflective portion and a planar reflective portion each extending along the input edge of the light guide, the concentrating reflector being positioned adjacent the input edge of the light guide, the planar reflective portion being oriented obliquely to an axis of the parabolic reflective portion, and one or more light emitters arranged between the planar reflective portion and the parabolic reflective portion and separated from the input edge of the light guide.

In some implementations, the one or more light emitters alternatively or additionally are side-emitting, surface-mount light-emitting diodes. In some implementations, the one or more light emitters alternatively or additionally are coupled to a circuit board, and the planar reflective portion alternatively or additionally is laminated to the circuit board. In some implementations, the parabolic reflective portion and the planar reflective portion alternatively or additionally are portions of a same formed sheet. In some implementations, the formed sheet alternatively or additionally includes an opening to accommodate a height of the one or more light emitters. In some implementations, the formed sheet alternatively or additionally includes a raised bump to accommodate a height of the one or more light emitters. In some implementations, the input edge of the light guide alternatively or additionally is arranged at least partially between the parabolic reflective portion and the planar reflective portion, and the one or more light emitters alternatively or additionally are separated from the input edge of the light guide by an air-filled gap. In some implementations, the planar reflective portion alternatively or additionally is nominally offset from a focus of the parabolic reflective portion. In some implementations, one or more of the parabolic reflective portion and the planar reflective portion alternatively or additionally includes a reflective coating.

Another example provides an electronic display comprising a light guide having a planar face and an input edge, a concentrating reflector having a parabolic reflective portion and a planar reflective portion each extending along the input edge of the light guide in a direction parallel to the input edge, an axis of the parabolic reflective portion being oblique to the planar face of the light guide, one or more light emitters arranged between the planar reflective portion and the parabolic reflective portion and separated from the input edge of the light guide, and an image-forming layer arranged parallel to the light guide.

In some implementations, the parabolic reflective portion and the planar reflective portion alternatively or additionally are portions of a same stamped metal sheet. In some implementations, the input edge of the light guide alternatively or additionally is positioned between the parabolic reflective portion and the planar reflective portion, and wherein the one or more light emitters alternatively or additionally are separated from the input edge of the light guide by an air-filled gap.

It will be understood that the configurations and/or approaches described herein are described for the purpose of example, and that these specific examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A flat-panel illuminator comprising:
    a concentrating reflector including a curved reflective portion;
    a light guide including a planar face and an input edge positioned adjacent the concentrating reflector; and
    one or more light emitters arranged within the concentrating reflector and spaced from the input edge of the light guide by an air-filled gap.

2. The flat-panel illuminator of claim 1, wherein the curved reflective portion is a parabolic reflective portion, and wherein the concentrating reflector includes a planar reflective portion.

3. The flat-panel illuminator of claim 2, wherein the planar reflective portion is oriented obliquely to an axis of the parabolic reflective portion.

4. The flat-panel illuminator of claim 2, wherein the light guide is positioned at least partially between the parabolic reflective portion and the planar reflective portion.

5. The flat-panel illuminator of claim 1, further comprising one or more of a diffuser and prism structure incorporated at the input edge of the light guide.

6. The flat-panel illuminator of claim 1, wherein the curved reflective portion is configured to concentrate light in a direction along a thickness direction of the light guide.

7. The flat-panel illuminator of claim 1, wherein the curved reflective portion is configured to concentrate light along a thickness of the light guide and along a length of the input edge.

8. The flat-panel illuminator of claim 1, wherein the one or more light emitters comprise one or more side emitting light-emitting diodes.

9. A flat-panel illuminator comprising:
    a light guide having a planar face and an input edge;
    a concentrating reflector having a parabolic reflective portion and a planar reflective portion each extending along the input edge of the light guide, the concentrating reflector being positioned adjacent the input edge of the light guide, the planar reflective portion being oriented obliquely to an axis of the parabolic reflective portion; and
    one or more light emitters arranged between the planar reflective portion and the parabolic reflective portion and separated from the input edge of the light guide.

10. The flat-panel illuminator of claim 9 wherein the one or more light emitters are side-emitting, surface-mount light-emitting diodes.

11. The flat-panel illuminator of claim 9 wherein the one or more light emitters are coupled to a circuit board, and wherein the planar reflective portion is laminated to the circuit board.

12. The flat-panel illuminator of claim 9 wherein the parabolic reflective portion and the planar reflective portion are portions of a same formed sheet.

13. The flat-panel illuminator of claim 12 wherein the formed sheet includes an opening to accommodate a height of the one or more light emitters.

14. The flat-panel illuminator of claim 12 wherein the formed sheet includes a raised bump to accommodate a height of the one or more light emitters.

15. The flat-panel illuminator of claim 9 wherein the input edge of the light guide is arranged at least partially between the parabolic reflective portion and the planar reflective portion, and wherein the one or more light emitters are separated from the input edge of the light guide by an air-filled gap.

16. The flat-panel illuminator of claim 15 wherein the planar reflective portion is nominally offset from a focus of the parabolic reflective portion.

17. The flat-panel illuminator of claim 9 wherein one or more of the parabolic reflective portion and the planar reflective portion includes a reflective coating.

18. An electronic display comprising:
    a light guide having a planar face and an input edge;
    a concentrating reflector having a parabolic reflective portion and a planar reflective portion each extending along the input edge of the light guide in a direction parallel to the input edge, an axis of the parabolic reflective portion being oblique to the planar face of the light guide;
    one or more light emitters arranged between the planar reflective portion and the parabolic reflective portion and separated from the input edge of the light guide; and
    an image-forming layer arranged parallel to the light guide.

19. The electronic display of claim 18 wherein the parabolic reflective portion and the planar reflective portion are portions of a same stamped metal sheet.

20. The electronic display of claim 18, wherein the input edge of the light guide is positioned between the parabolic reflective portion and the planar reflective portion, and wherein the one or more light emitters are separated from the input edge of the light guide by an air-filled gap.

* * * * *